United States Patent
Liang

(10) Patent No.: US 12,202,982 B2
(45) Date of Patent: *Jan. 21, 2025

(54) METHOD FOR MANUFACTURING A SPECIAL EFFECT PIGMENT USING AN EMULSION

(71) Applicant: VIAVI SOLUTIONS INC., Chandler, AZ (US)

(72) Inventor: Kangning Liang, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,921

(22) Filed: Apr. 18, 2023

(65) Prior Publication Data
US 2023/0250293 A1 Aug. 10, 2023

Related U.S. Application Data

(63) Continuation of application No. 16/383,056, filed on Apr. 12, 2019, now Pat. No. 11,655,374.

(51) Int. Cl.
| | |
|---|---|
| *C09C 1/00* | (2006.01) |
| *B05D 1/38* | (2006.01) |
| *B05D 3/02* | (2006.01) |
| *B05D 3/06* | (2006.01) |
| *B05D 5/06* | (2006.01) |
| *C08K 3/30* | (2006.01) |
| *C08K 5/06* | (2006.01) |
| *C08K 5/07* | (2006.01) |
| *C08K 5/14* | (2006.01) |
| *C08K 5/23* | (2006.01) |
| *C08K 5/45* | (2006.01) |
| *C09C 3/10* | (2006.01) |

(52) U.S. Cl.
CPC .............. *C09C 1/0021* (2013.01); *B05D 1/38* (2013.01); *B05D 3/0254* (2013.01); *B05D 3/067* (2013.01); *B05D 5/068* (2013.01); *C08K 3/30* (2013.01); *C08K 5/06* (2013.01); *C08K 5/07* (2013.01); *C08K 5/14* (2013.01); *C08K 5/23* (2013.01); *C08K 5/45* (2013.01); *C09C 3/10* (2013.01); *B05D 2202/25* (2013.01); *B05D 2202/30* (2013.01); *B05D 2202/45* (2013.01); *B05D 2401/10* (2013.01); *B05D 2401/30* (2013.01); *B05D 2502/00* (2013.01); *B05D 2503/00* (2013.01); *B05D 2504/00* (2013.01); *B05D 2506/00* (2013.01); *B05D 2518/10* (2013.01); *C08K 2003/3045* (2013.01)

(58) Field of Classification Search
CPC ........... C09C 1/0021; C09C 3/10; B05D 1/38; B05D 3/0254; B05D 3/067; B05D 5/068; B05D 2202/25; B05D 2202/30; B05D 2202/45; B05D 2401/10; B05D 2401/30; B05D 2502/00; B05D 2503/00; B05D 2504/00; B05D 2506/00; B05D 2518/10; C08K 3/30; C08K 5/06; C08K 5/07; C08K 5/14; C08K 5/23; C08K 5/45; C08K 2003/3045
See application file for complete search history.

(56) References Cited

U.S. PATENT DOCUMENTS

| | | |
|---|---|---|
| 4,194,920 A | 3/1980 | Burke et al. |
| 4,680,200 A | 7/1987 | Solc |
| 10,138,390 B2 | 11/2018 | Zhao |
| 2006/0063004 A1 | 3/2006 | Takano et al. |
| 2006/0165735 A1 | 7/2006 | Abril et al. |
| 2007/0141247 A1 | 6/2007 | Hall et al. |
| 2008/0110368 A1 | 5/2008 | Ortalano et al. |
| 2009/0264575 A1 | 10/2009 | Henglein et al. |
| 2010/0021701 A1* | 1/2010 | Heinrichs ............. C09D 5/035 430/108.4 |
| 2014/0050768 A1 | 2/2014 | Struck et al. |
| 2014/0171585 A1 | 6/2014 | Dandreaux et al. |
| 2016/0280952 A1 | 9/2016 | Sun et al. |
| 2019/0231889 A1* | 8/2019 | Hoogenboom .... A61K 48/0008 |

FOREIGN PATENT DOCUMENTS

| | | |
|---|---|---|
| CN | 1400223 A | 3/2003 |
| CN | 101084241 A | 12/2007 |
| CN | 102659990 A | 9/2012 |
| CN | 103289012 A | 9/2013 |
| CN | 103665964 A | 3/2014 |
| JP | 2010043224 A | 2/2010 |
| WO | 2016094245 A1 | 6/2016 |
| WO | 2020210230 A1 | 10/2020 |

* cited by examiner

Primary Examiner — James M Mellott
(74) Attorney, Agent, or Firm — Mannava & Kang, P.C.

(57) ABSTRACT

A method of making pigments, such as special effect pigment includes forming a first slurry including a substrate, a polymer precursor, and a radical initiator; forming a solution including an emulsifier; and combining the first slurry and the solution so that the substrate is encapsulated by a first coating. Special effect pigments formed by the method are also disclosed.

18 Claims, No Drawings

METHOD FOR MANUFACTURING A SPECIAL EFFECT PIGMENT USING AN EMULSION

PRIORITY

This patent application is a Continuation of under 35 U.S.C. § 120 of co-pending U.S. patent application Ser. No. 16/383,056, filed Apr. 12, 2019, the disclosure of which is hereby incorporated by reference in its entirety.

FIELD OF THE INVENTION

The present disclosure generally relates to pigments, such as special effect pigments. A method of making a pigment, such as a special effect pigment, includes forming a first slurry including a substrate, a polymer precursor, and a radical initiator; forming a solution including an emulsifier; and combining the first slurry and the solution so that the substrate is encapsulated by a first coating.

BACKGROUND OF THE INVENTION

The manufacture of special effect pigments generally requires complex vacuum processes, time-consuming stepwise coatings, and expensive post processing, such as stripping and grinding. The complexity in manufacturing special effect pigments greatly limits production throughput and demands large amounts of investment in equipment and processes.

For example, in a special effect pigment with organic coatings, a reflector flake is covered by colored coatings on two opposite surfaces. As a result, stepwise processes are employed and a vacuum deposition of a metal reflector layer is required.

SUMMARY OF THE INVENTION

In an aspect, there is disclosed a method of making pigments, including, forming a first slurry including a substrate, a polymer precursor, and a radical initiator; forming a solution including an emulsifier; and combining the first slurry and the solution so that the substrate is encapsulated by a first coating.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

It is to be understood that both the foregoing general description and the following detailed description are exemplary and explanatory only, and are intended to provide an explanation of various embodiments of the present teachings. In its broad and varied embodiments, disclosed herein is a method for making pigments, such as special effect pigments.

The method of making pigments, such as special effect pigments can include forming a first slurry including a substrate, a polymer precursor, and a radical initiator; forming a solution including an emulsifier; and combining the first slurry and the solution so that the substrate is encapsulated by a first coating. This method is simple and low-cost and can create a colored, polymer coating that encapsulates a substrate. The method can be performed in one step or can be done in multiple steps. The method can be performed in a batch production method for high throughput.

The method includes forming a first slurry including a substrate, and a polymer precursor, such as at least one polymer precursor, and a radical initiator. The first slurry can also optionally include a first solvent. The first slurry can also optionally include a colorant.

The substrate for use in the first slurry can include single layer of material or a multi-layer structure, which will be explained in more detail below. In an aspect, the single layer of material can be a reflector layer. The reflector layer can be a wideband reflector, e.g., spectral and Lambertian reflector (e.g., white $TiO_2$). The reflector layer can be a metal, non-metal, or metal alloy. In one example, the materials for the reflector layer can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Other reflective materials can also be used in place of aluminum. For example, copper, silver, gold, platinum, palladium, nickel, cobalt, niobium, chromium, tin, and combinations or alloys of these or other metals can be used as material in a single layer of material or a multi-layer structure. In an aspect, the material for the reflector layer can be a white or light colored metal. In other examples, the reflector layer can include, but is not limited to, the transition and lanthanide metals and combinations thereof; as well as metal carbides, metal oxides, metal nitrides, metal sulfides, a combination thereof, or mixtures of metals and one or more of these materials.

The thickness of the reflector layer can range from about 5 nm to about 5000 nm, although this range should not be taken as restrictive. For example, the lower thickness limit can be selected so that the reflector layer provides a maximum transmittance of 0.8. Additionally, or alternatively, for a reflector layer including aluminum the optical density (OD) can be from about 0.1 to about 4 at a wavelength of about 550 nm.

In order to obtain a sufficient optical density and/or achieve a desired effect, a higher or lower minimum thicknesses can be required depending on the composition of the reflector layer. In some examples, the upper limit can be about 5000 nm, about 4000 nm, about 3000 nm, about 1500 nm, about 200 nm, and/or about 100 nm. In one aspect, the thickness of the at least one reflector layer can range from about 10 nm to about 5000 nm for example, from about 15 nm to about 4000 nm, from about 20 nm to about 3000 nm.

The first slurry can include a polymer precursor, such as at least one polymer precursor, that can polymerize to form a first coating around the substrate. The polymer precursor can be any monomer or oligomer that is polymerizable. Non-limiting examples of the polymer precursor include acrylic monomers, alcohols, allyl monomers, amine monomers, anhydride monomers, carboxylic acid monomers, epoxide monomers, isocyanate monomers, silicone monomers, styrene monomers, functionalized styrene monomers, vinyl esters, vinyl ethers, vinyl halides, vinyl amines, vinyl amides, and combinations thereof. The polymer precursor can undergo polymerization during the method to form a polymer (first) coating that encapsulates the substrate. The resultant polymer coating will be explained more fully below.

The first slurry can include a radical initiator that can assist in polymerizing the polymer precursor to form a first (polymer) coating around the substrate. The radical initiator can be chosen from a photoinitiator, a thermal initiator, and a redox initiator. Non-limiting examples of a photoinitiator include benzophenones, benzoyl ethers, benzil monoketals, dialkoxyacetophenones, thioxanthones, hydroxyalkylphenones, and combinations thereof. Representative examples of photoinitiators include benzophenone, benzil dimethyl ketal, benzoin methyl ether, benzoin isopropyl ether, diethoxyacetophenone, dibutoxyacetophenone, methyl phenyl glycoxylate, 2chlorothioxanthone, 2-ethylthioxanthone, 2isopropylthioxanthone, 2,4-diethylthioxanthone, phenyl 2-hydroxy-2-propyl ketone, 4-isopropylphenyl 2-hydroxy-2-propyl ketone, 4-n-dodecylphenyl 2-hydroxy-2-propyl ketone, 4-(2-hydroxyethoxy)phenyl 2-hydroxy-2-propyl ketone, 4-(2acryloyloxyethoxy)phenyl 2-hydroxy-2-propyl ketone, 1-benzoylcyclohexanol, phenyl 2-hydroxy-2-propyl ketone, 1-benzoyl-cyclohexanol, 4-(2-hydroxyethoxy)phenyl 2-hydroxy-2-propyl ketone, isopropylthioxanthone, and 2-dimethylaminoethyl benzoate. Commercially available photoinitiators are sold under the following tradenames: IRGACURE® 819, DAROCUR® TPO, IRGACURE® 369.

Non-limiting examples of a thermal initiator include azo initiators, peroxide initiators, persulfate initiators, and combinations thereof. Representative examples of azo initiators include 2,2'-azobisisobutyronitrile, 2,2'-azobis(4-methoxy-2,4-dimethylvaleronitrile); 2,2'-azobis(2-amidinopropane) dihydrochloride; 2,2'-azobis(2,4-dimethylvaleronitrile); 2,2'-azobis(isobutyronitrile); 2,2'-azobis-2-methylbutyronitrile; 1,1'-azobis(1-cyclohexanecarbonitrile), 2,2'-azobis (methyl isobutyrate). Representative examples of peroxide initiators include benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butylperoxypivalate, t-butyl peroxy-2-ethylhexanoate, and dicumyl peroxide. Representative examples of persulfate initiators include potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based on organic peroxides and tertiary amines (for example, benzoyl peroxide plus dimethylaniline); and systems based on organic hydroperoxides and transition metals, for example, cumene hydroperoxide plus cobalt naphthenate. Non-limiting examples of reductants that can be used in a redox initiator include $Fe^{2+}$, $Co^{2+}$, and $Cu^+$.

The first slurry can also include a colorant, such as a pigment or dye.

Non-limiting examples of suitable dyes can include FD&C dyes, acid dyes, direct dyes, reactive dyes, phthalocyanine dyes, derivatives of phthalocyanine sulfonic acids, and combinations thereof. Non-limiting examples of suitable organic dyes include copper phthalocyanine, perylene, anthraquinones, and the like; diarylmethane dyes, triarylmethane dyes, acridine dyes, quinolone dyes, thiazole dyes, indophenol dyes, oxazine dyes, thiazine dyes, natural dyes, azo dyes and azo metal dyes such as aluminum red RLW, aluminum copper, aluminum bordeaux RL, aluminum fire-red ML, aluminum red GLW, aluminum violet CLW, and the like; as well as combinations or mixtures thereof. Suitable dyes can include, but are in no way limited to, those listed in the Color Index International database, such as C.I. Acid Red 440, C.I. Reactive Red 3, C.I. Reactive Red 13, C.I. Reactive Red 23, C.I. Reactive Red 24, C.I. Reactive Red 33, C.I. Reactive Red 43, C.I. Reactive Red 45, C.I. Reactive Red 120, C.I. Reactive Red 180, C.I. Reactive Red 194, C.I. Reactive Red 220, C.I. Reactive Violet 4, C.I. Reactive Blue 19, C.I. Reactive Blue 5, C.I. Reactive Blue 49, C.I. Reactive Yellow 2, C.I. Reactive Yellow 3, C.I. Reactive Black 39, and combinations thereof.

Suitable pigments can be black pigments, white pigments, cyan pigments, magenta pigments, yellow pigments, or the like. Further, pigments can be organic or inorganic particles as is well known in the art. Suitable inorganic pigments include, for example, carbon black, titanium oxide, cobalt blue ($CoO-Al_2O_3$), chrome yellow ($PbCrO_4$), and iron oxide. Suitable inorganic colorants include titanium nitride, chromium nitride, chromium oxide, iron oxide, cobalt-doped alumina, combinations or mixtures thereof, and the like.

Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138.

The first slurry can also optionally include a solvent, such as water or an organic solvent. Non-limiting examples of solvents can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), methyl isobutyl ketone, cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; cyclohexanone; chlorobenzene; butanol; and mixtures thereof.

The first slurry can be formed before, during, or after forming a solution including an emulsifier and/or surfactant. Non-limiting examples of emulsifiers include agar, albumin, alginates, casein, ceatyl alcohol, cholic acid, desoxycholic acid, diacetyl tartaric acid esters, glycerol, gum, carrageenan, lecithin, monoglyceride, diglyceride, monosodium phosphate, monostearate, propylene glycol, cellulose, and combinations thereof.

The surfactant can be, for example, an anionic surfactant, a cationic surfactant, a zwitterionic surfactant, and a nonionic surfactant. Non-limiting examples of anionic surfactants include sulfates, sulfonates, phosphate esters, carboxylates, and cationic head groups, such as primary, secondary, or tertiary amines. Non-limiting examples of zwitterionic surfactants include compounds with a phosphate anion with an amine. Non-limiting examples of nonionic surfactants include ethoxylated, fatty alcohol ethoxylates, alkylphenol ethoxylates, ethoxylated amines, ethoxylated fatty acid amides, poloxamers, fatty acid esters of glycerol, fatty acid esters of sorbitol, fatty acid esters of sucrose, alkyl polyglucosides, amine oxides, sulfoxides, phosphine oxides, and combinations thereof. In an aspect, the functional component is a surfactant chosen from sodium dodecyl sulfate (anionic surfactant), Triton X-100 (a nonionic surfactant also known as octyl phenol ethoxylated), cetyl trimethylammonium chloride (cationic surfactant), and mixtures thereof.

The solution can be formed before, during, or after formation of the first slurry. Additionally, the formed solution can be agitated before, during, and/or after formation of the first slurry. In an aspect, the formed solution can be agitated before it is combined with the first slurry. Once the first slurry is combined with the solution, the first slurry can be broken up into droplets dispersed in the solution. Additionally, the radical initiator present in the first slurry can decompose by at least one of heat, light, and redox reactions. The decomposition of the radical initiator upon combining the first slurry and the solution can initiate radical polymerization of the polymer precursor in the first slurry. The radical polymerization of the polymer precursor can form the first (polymer) coating encapsulating the substrate.

The radical polymerization of the polymer precursor can yield a first (polymer) coating. The polymer can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. Non-limiting examples of inorganic polymers includes silanes, siloxanes, titanates, zirconates, aluminates, silicates, phosphazanes, polyborazylenes, and polythiazyls. In an aspect, the polymer can include cellulose acetate butyrate, polystyrene, polyvinyl acetate, polymethyl methacrylate, and mixtures thereof.

The first slurry can be combined with the solution for any period of time sufficient to form a first (polymer) coating around the substrate. In an aspect, the first slurry can be combined with the solution for a period of time from about 10 seconds to about 10 minutes, for example from about 15 seconds to about 8 minutes, and as a further example, from about 20 seconds to about 6 minutes.

The method disclosed above produces a pigment having a substrate encapsulated with a first (polymer) coating, and optionally a colorant. It is envisioned that the process steps can be repeated to provide multiple encapsulations by a polymer to form additional coatings (second coating, third coating, fourth coating, etc.). Each additional coating can be formed of the same or different materials used in forming the first coating. In an aspect, the method can further include forming a second slurry with at least one component that is different from the first slurry. For example, the at least one component that is different can be a different polymer precursor, a different radical initiator, and optionally a different colorant. The substrate in the second slurry is the formed pigment (substrate encapsulated by a polymer to form a first coating).

The method can further include forming a second solution that is the same or different from the solution used to form the pigment. The second solution can be formed before, during, or after forming the second slurry. Additionally, the second solution can be agitated before, during, and/or after it is combined with the second slurry. Again, a radical initiator present in the second slurry can decompose cause radical polymerization of the polymer precursor present in the second slurry. In this manner, the first coating can be encapsulated with a second coating of the polymerized polymer precursor from the second slurry.

A special effect pigment can be formed having a substrate, such as a reflector layer, and a first coating of a polymer, and optionally a colorant. Multiple coatings can be applied so that each additional coating (second coating, third coating, etc.) can include a different polymer, and/or a different colorant to provide different physical and optical properties to the special effect pigment.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A method of making pigments, comprising:
forming a slurry including a substrate, a colorant, a polymer precursor, and a radical initiator, wherein the substrate is a single layer of a reflector material chosen from a metal or a metal alloy;
forming a solution including an emulsifier; and
combining the slurry and the solution so that the substrate is encapsulated by a coating, wherein the coating is a colored polymer coating,
wherein the radical initiator is chosen from a photoinitiator, a thermal initiator, or a redox initiator.

2. The method of claim 1, wherein the single layer of material is a reflector material chosen from aluminum, copper, silver, gold, platinum, palladium, nickel, cobalt, niobium, chromium, tin, combinations thereof, or alloys thereof.

3. The method of claim 2, wherein the polymer precursor is chosen from acrylic monomers, alcohols, allyl monomers, amine monomers, anhydride monomers, carboxylic acid monomers, epoxide monomers, isocyanate monomers, silicone monomers, styrene monomers, functionalized styrene monomers, vinyl esters, vinyl ethers, vinyl halides, vinyl amines, vinyl amides, or combinations thereof.

4. The method of claim 3, wherein the emulsifier is chosen from agar, albumin, alginates, casein, ceatyl alcohol, cholic acid, desoxycholic acid, diacetyl tartaric acid esters, glycerol, gum, carrageenan, monoglyceride, diglyceride, monosodium phosphate, monostearate, propylene glycol, cellulose, or combinations thereof.

5. The method of claim 3, wherein encapsulating the substrate comprises the radical polymerization of the polymer precursor to form the colored polymer coating.

6. The method of claim 1, wherein the polymer precursor is chosen from acrylic monomers, alcohols, allyl monomers, amine monomers, anhydride monomers, carboxylic acid monomers, epoxide monomers, isocyanate monomers, silicone monomers, styrene monomers, functionalized styrene monomers, vinyl esters, vinyl ethers, vinyl halides, vinyl amines, vinyl amides, or combinations thereof.

7. The method of claim 1, wherein the emulsifier is chosen from agar, albumin, alginates, casein, ceatyl alcohol, cholic acid, desoxycholic acid, diacetyl tartaric acid esters, glycerol, gum, carrageenan, monoglyceride, diglyceride, monosodium phosphate, monostearate, propylene glycol, cellulose, or combinations thereof.

8. The method of claim 1, wherein encapsulating the substrate comprises the radical polymerization of the polymer precursor to form the colored polymer coating.

9. The method of claim 1, wherein the photoinitiator is chosen from
a benzophenone, benzoyl ether, benzil monoketals, dialkoxyacetophenones, thioxanthones, hydroxyalkylphenones, or combinations thereof.

10. The method of claim 1, wherein the thermal initiator is chosen from azo initiators, peroxide initiators, persulfate initiators, or combinations thereof.

11. The method of claim 1, wherein the colorant is a dye or a pigment.

12. The method of claim 1, wherein the slurry further comprises a solvent chosen from acetates, water, ketones, acetone, glycol, glycol derivatives, alcohols, esters, hydrocarbons, cyclohexanone, chlorobenzene, or combinations thereof.

13. The method of claim 1, wherein the solution further comprises a surfactant.

14. The method of claim 1, further comprising, before combining the slurry and the solution, agitating the solution.

15. The method of claim 1, wherein the radical initiator is the photoinitiator, and further wherein the photoinitiator is chosen from a benzophenone, benzoyl ether, benzil monoketals, dialkoxyacetophenones, thioxanthones, hydroxyalkylphenones, or combinations thereof.

16. The method of claim 1, wherein the radical initiator is the thermal initiator, and further wherein the thermal initiator is chosen from azo initiators, peroxide initiators, persulfate initiators, or combinations thereof.

17. A method of making pigments, comprising:
forming a slurry including a substrate, a colorant, a polymer precursor, and a radical initiator, wherein the substrate is a single layer of a reflector material chosen from a metal or a metal alloy;
forming a solution including an emulsifier; and
combining the slurry and the solution so that the substrate is encapsulated by a coating, wherein the coating is a colored polymer coating,
wherein combining the slurry and the solution includes decomposing the radical initiator by at least one of heat, light, and redox reactions.

18. A method of making pigments, comprising:
forming a slurry including a substrate, a colorant, a polymer precursor, and a radical initiator, wherein the substrate is a single layer of a reflector material chosen from a metal or a metal alloy;
forming a solution including an emulsifier; and
combining the slurry and the solution so that the substrate is encapsulated by a coating, wherein the coating is a colored polymer coating,
wherein combining the slurry and the solution includes radical polymerization of the polymer precursor to form the coating encapsulating the substrate.

* * * * *